United States Patent
Niu et al.

(10) Patent No.: US 10,829,715 B2
(45) Date of Patent: Nov. 10, 2020

(54) HIGH-EFFICIENCY SUPERCRITICAL OIL EXTRACTION METHOD

(71) Applicant: SHAANXI NORMAL UNIVERSITY, Shaanxi (CN)

(72) Inventors: Pengfei Niu, Shaanxi (CN); Nongxue Qiu, Shaanxi (CN); Xiaojie Su, Shaanxi (CN); Yurong Guo, Shaanxi (CN); Yonghong Meng, Shaanxi (CN); Hong Deng, Shaanxi (CN)

(73) Assignee: SHAANXI NORMAL UNIVERSITY, Shaanxi (CN)

( * ) Notice: Subject to any disclaimer, the term of this patent is extended or adjusted under 35 U.S.C. 154(b) by 0 days.

(21) Appl. No.: 16/082,030

(22) PCT Filed: Sep. 30, 2017

(86) PCT No.: PCT/CN2017/104749
§ 371 (c)(1),
(2) Date: Sep. 4, 2018

(87) PCT Pub. No.: WO2018/077013
PCT Pub. Date: May 3, 2018

(65) Prior Publication Data
US 2019/0330559 A1    Oct. 31, 2019

(30) Foreign Application Priority Data

Oct. 27, 2016  (CN) .......................... 2016 1 0953741

(51) Int. Cl.
*C11B 1/10* (2006.01)
*B01D 11/04* (2006.01)
(52) U.S. Cl.
CPC .......... *C11B 1/104* (2013.01); *B01D 11/0403* (2013.01)
(58) Field of Classification Search
CPC .......................... C11B 1/104; B01D 11/0403
USPC ........................................................... 554/8
See application file for complete search history.

(56) References Cited

U.S. PATENT DOCUMENTS

2012/0283457 A1    11/2012   Du et al.

FOREIGN PATENT DOCUMENTS

| CN | 1281032 | A |  | 1/2001 |
|---|---|---|---|---|
| CN | 1477181 | A |  | 2/2004 |
| CN | 1442484 | A |  | 11/2004 |
| CN | 1850954 | A |  | 10/2006 |
| CN | 101077990 | A |  | 11/2007 |
| CN | 102533446 | A |  | 5/2014 |
| CN | 103773597 | A |  | 5/2014 |
| CN | 103773598 | A | * | 5/2014 |
| CN | 103773598 | A |  | 5/2014 |
| CN | 106635404 | A |  | 5/2017 |
| JP | H04356786 | A |  | 12/1992 |
| WO | 2013151407 | A1 |  | 10/2013 |

OTHER PUBLICATIONS

English translation of CN 103773598 (Year: 2014).*

* cited by examiner

*Primary Examiner* — Deborah D Carr

(57) ABSTRACT

A high-efficiency supercritical oil extraction method is provided. According to the method, in an early extraction stage, extraction is performed using an extractant along an extraction kettle from top to bottom; in a middle extraction stage, the extraction kettle is longitudinally flipped by 180 degrees, extraction is still performed using an extractant along the extraction kettle from top to bottom; in a later extraction stage, extraction is performed using a conventional extractant along the extraction kettle from bottom to top. Thus, the pressure effect and the critical extraction effect of the critical extractant are simultaneously exerted, thereby greatly improving the extraction efficiency of supercritical oil extraction, shortening the extraction time, and reducing the dosage of extractant, so as to achieve high-efficiency and low-cost oil extraction.

8 Claims, No Drawings

HIGH-EFFICIENCY SUPERCRITICAL OIL EXTRACTION METHOD

CROSS REFERENCE OF RELATED APPLICATION

This is a U.S. National Stage under 35 U.S. 371 of the International Application PCT/CN2017/104749, filed Sep. 30, 2017, which claims priority under 35 U.S.C. 119(a-d) to CN 201610953741.0, filed Oct. 27, 2016.

BACKGROUND OF THE PRESENT INVENTION

Field of Invention

The present invention relates to the field of oil extraction, and more particularly to a quick supercritical oil extraction method.

Description of Related Arts

Supercritical fluid means that when an object is above its critical temperature and critical pressure, the gas in this state is not liquefied after being pressurized and just increases in density, and it has liquid-like properties while retaining gas properties. The supercritical fluid combines the advantages of both gas and liquid. Its density is close to liquid, its solubility is strong, its viscosity is similar to that of gas, and its diffusion coefficient is much larger than that of ordinary liquid, which is conducive to mass transfer. In addition, the supercritical fluid has a zero surface tension and is easily infiltrated into the pores of the extracted substance. Therefore, the supercritical fluid has good dissolution and mass transfer characteristics, and can quickly reach the mass transfer balance with the extract, thereby achieving effective separation of the substance.

The supercritical fluid extraction and separation process utilizes the relationship between its solubility and density, that is, utilizes the effect of pressure and temperature on the solubility of the supercritical fluid. In the supercritical state, the fluid contacts with the substance to be separated, so as to selectively extract components with different polarity, boiling point, and molecular mass in sequence; and then, the supercritical fluid is turned into a common gas by means of decompression and temperature rising, and the extracted substance is automatically completely or basically precipitated, thereby achieving the purpose of separation and purification, and integrating two processes of extraction and separation into a whole.

Whether the supercritical fluid extraction process can effectively separate products or remove impurities, the key is that the solvent used in the extraction must have good selectivity. There are many types of supercritical fluids currently studied, which are mainly carbon dioxide, toluene, methanol, ethylene, ethane, propane, acetone and ammonia. In recent years, carbon dioxide has been mostly used as the supercritical fluid extractant. The critical state of carbon dioxide is easy to reach, its critical temperature is close to room temperature, its critical pressure is not high, and it has good diffusion performance and low surface tension, and is non-toxic, odorless, non-flammable, inexpensive and easy to be refined. These properties are more attractive for heat-sensitive and oxidizable natural products.

The supercritical extraction technology is one of the main directions of future oil extraction. According to the current literature reports, the oil extraction process has many characteristics such as "green and environmental protection, low-cost, and easy to implement", and has even been applied by some oil production enterprises for producing high-end grease. However, in the decades that the technology has emerged, it has not been widely used. In the traditional supercritical extraction process, the extractant flows through the extraction kettle from bottom to top, the inlet of the extractant inlet is located at the bottom of the extraction kettle, and the outlet of the extractant outlet is located on the lid at the top portion of the extraction kettle or on the side of the upper end of the extraction kettle. Although there have been many literature reports on the improvement of supercritical extraction process, including the effect of factors on the extraction yield, such as extraction pressure, extraction temperature, carbon dioxide flow rate and extraction time, it is difficult to overcome the persistent drawback of low production efficiency in the supercritical oil extraction.

SUMMARY OF THE PRESENT INVENTION

A technical problem to be solved by the present invention is to provide a high-efficiency supercritical oil extraction method, so as to overcome the problem that the existing supercritical oil extraction methods are low in production efficiency.

To solve the above technical problem, the present invention provides a technical solution as follows.

A high-efficiency supercritical oil extraction method comprises steps of:

(S1) loading material which comprises:

opening a lid at a top portion of an extraction kettle, laying a first layer of filter paper on a bottom of the extraction kettle, laying a first layer of degreasing cotton on the filter paper, adding an oily raw material on the first layer of degreasing cotton, compacting the oily raw material, laying a second layer of degreasing cotton on the compacted oily raw material, laying a second layer of filter paper on the second layer of degreasing cotton, and covering the lid at the top portion of the extraction kettle;

(S2) extracting in an early stage which comprises:

injecting a first amount of extractant into the extraction kettle, flowing the first amount of extractant through the extraction kettle from top to bottom, adjusting an extraction temperature to be in a range of 20 to 80° C. and an extraction pressure to be in a range of 20 to 80 MPa, firstly extracting for 30-180 s, obtaining a first liquid grease, opening an outlet pipeline valve of the extraction kettle, flowing the first liquid grease out of the outlet of the extraction kettle, closing the outlet pipeline valve of the extraction kettle, forming a first cycle, repeating the first cycle for 2-5 times, and completing the extraction in the early stage;

(S3) extracting in a middle stage which comprises:

longitudinally flipping the extraction kettle by 180 degrees, injecting a second amount of extractant into the extraction kettle, flowing the second amount of extractant through the extraction kettle from top to bottom, adjusting the extraction temperature to be in a range of 20 to 80° C. and the extraction pressure to be in a range of 20 to 80 MPa, secondly extracting for 30-180 s, obtaining a second liquid grease, opening the outlet pipeline valve of the extraction kettle, flowing the second liquid grease out of the outlet of the extraction kettle, closing the outlet pipeline valve of the extraction kettle, forming a second cycle, repeating the second cycle for 2-5 times, and completing the extraction in the middle stage; and (S4) extracting in a late stage which comprises:

injecting a third amount of extractant into the extraction kettle, flowing the third amount of extractant through the extraction kettle from bottom to top, adjusting the extraction temperature to be in a range of 20 to 80° C. and the extraction pressure to be in a range of 20 to 80 MPa, thirdly extracting for 10-15 s, obtaining a third liquid grease, opening the outlet pipeline valve of the extraction kettle for 3-5 s, closing the outlet pipeline valve of the extraction kettle, forming a third cycle, repeating the third cycle for 2-3 times, and completing the extraction in the late stage.

Preferably, in the step of (S2), the first amount of extractant is injected into the extraction kettle, the first amount of extractant flows through the extraction kettle from top to bottom, the extraction temperature is adjusted to be in a range of 30 to 50° C., the extraction pressure is adjusted to be in a range of 30 to 50 MPa, the first extraction is performed for 60-120 s, the first liquid grease is obtained, the outlet pipeline valve of the extraction kettle is opened, the first liquid grease flows out of the outlet of the extraction kettle, the outlet pipeline valve of the extraction kettle is closed, the first cycle is formed, the first cycle is repeated for 3-4 times, and the extraction in the early stage is completed.

Preferably, in the step of (S3), the extraction kettle is longitudinally flipped by 180 degrees, the second amount of extractant is injected into the extraction kettle, the second amount of extractant flows through the extraction kettle from top to bottom, the extraction temperature is adjusted to be in a range of 30 to 50° C. and the extraction pressure is adjusted to be in a range of 30 to 50 MPa, the second extraction is performed for 60-120 s, the second liquid grease is obtained, the outlet pipeline valve of the extraction kettle is opened, the second liquid grease flows out of the outlet of the extraction kettle, the outlet pipeline valve of the extraction kettle is closed, the second cycle is formed, the second cycle is repeated for 3-4 times, and the extraction in the middle stage is completed.

Preferably, in the step of (S4), the third amount of extractant is injected into the extraction kettle, the third amount of extractant flows through the extraction kettle from bottom to top, the extraction temperature is adjusted to be in a range of 30 to 50° C. and the extraction pressure is adjusted to be in a range of 30 to 35 MPa, the third extraction is performed for 10-15 s, the third liquid grease is obtained, the outlet pipeline valve of the extraction kettle is opened for 3-5 s and then the outlet pipeline valve of the extraction kettle is closed, the third cycle is formed, the third cycle is repeated for 2-3 times, and the extraction in the late stage is completed.

Preferably, all of the first amount of extractant, the second amount of extractant and the third amount of extractant are carbon dioxide.

Compared with conventional extraction methods, the present invention has innovative points and beneficial effects as follows.

(1) In the present invention, two ends of a raw material are respectively padded with two seal layers that prevent the raw material from diffusing with the extractant, and the raw material is compacted (the general supercritical extraction methods require loose raw materials), so as to ensure that there is no gap between the raw material and the wall of the extraction kettle, thus creating conditions for the later bidirectional extrusion extraction.

(2) In the early extraction stage of the present invention, the extractant flows through the extraction kettle from top to bottom, and simultaneously, the pressure effect and the extraction effect of the extractant are exerted (among them, the pressure effect is dominant) for improving the extraction efficiency; in the middle extraction stage of the present invention, the extraction kettle is longitudinally flipped by 180 degrees, the extractant still flows through the extraction kettle from top to bottom, and simultaneously, the pressure effect and the extraction effect of the extractant continues to be exerted (among them, the pressure effect is dominant) for improving the extraction efficiency; in the late extraction stage of the present invention, the extractant flows through the extraction kettle from bottom to top and the extraction effect of the extractant is exerted for improving the extraction efficiency.

(3) The method provided by the present invention greatly improves the extraction efficiency of the supercritical oil extraction, significantly shortens the extraction time, and is low in dosage of the extractant, so that the efficient and low-cost extraction of oils is achieved.

DETAILED DESCRIPTION OF THE PREFERRED EMBODIMENT

The present invention will be further described in detail with reference to embodiments as follows, and however, the protective scope of the present invention is not limited to the embodiments.

First Embodiment (1) Loading Material:

A SFE-2 model supercritical extractor, produced by American Applied Separation Company, is adopted. A volume of an extraction kettle is 200 mL. A tip at a top portion of the extraction kettle is opened, a first layer of filter paper is laid on a bottom of the extraction kettle, a first layer of degreasing cotton with a thickness of 1.5 cm is laid on the first layer of filter paper, 61 g of walnut mud is added on the first layer of degreasing cotton and then compacted for ensuring that there is no gap between the walnut mud and a kettle wall of the extraction kettle, a second layer of degreasing cotton with a thickness of 1.5 cm is laid on the walnut mud, a second layer of filter paper is laid on the second layer of degreasing cotton, and finally the lid at the top portion of the extraction kettle is covered.

(2) Extracting in an Early Stage:

The extraction kettle is perpendicularly installed on the supercritical extractor, a first amount of carbon dioxide fluid is injected into the extraction kettle, the first amount of carbon dioxide fluid flows through the extraction kettle from top to bottom, an extraction temperature is adjusted to 35° C., an extraction pressure is adjusted to 50 MPa, the first extraction is performed for 120 s, a first liquid grease is obtained, an outlet pipeline valve of the extraction kettle is opened to a maximum state, the first liquid grease flows out of the outlet of the extraction kettle, the outlet pipeline valve of the extraction kettle is closed when a large amount of gaseous carbon dioxide flows out of the extraction kettle, a first cycle is formed, the first cycle is repeated for 4 times, and the extracting in the early stage is completed. The extracting in the early stage needs about 15 min, and the obtained grease is about 20.45 g.

(3) Extracting in a Middle Stage:

The extraction kettle is longitudinally flipped by 180 degrees, a second amount of carbon dioxide fluid is injected into the extraction kettle, the second amount of carbon dioxide fluid flows through the extraction kettle from top to bottom, the extraction temperature is adjusted to 35° C., the extraction pressure is adjusted to 50 MPa, the second extraction is performed for 60 s, a second liquid grease is obtained, the outlet pipeline valve of the extraction kettle is opened to the maximum state, the second liquid grease flows out of the outlet of the extraction kettle, the outlet pipeline valve of the extraction kettle is closed when a large amount of gaseous carbon dioxide flows out of the extraction kettle, a second cycle is formed, the second cycle is repeated for 2 times, and the extracting in the middle stage is completed. The extracting in the middle stage needs about 8 min, and the obtained grease is about 35.21 g.

(4) Extracting in a Late Stage:

A third amount of carbon dioxide fluid is injected into the extraction kettle, the third amount of carbon dioxide fluid flows through the extraction kettle from bottom to top, the extraction temperature is adjusted to 50° C., the extraction pressure is adjusted to 35 MPa, the third extraction is performed for 10 s, a third liquid grease is obtained, the outlet pipeline valve of the extraction kettle is opened for 5 s and then is closed, a third cycle is obtained, the third cycle is repeated for 5 times, and the extracting in the late stage is completed. The extracting in the late stage needs about 5 min, and the obtained grease is about 36.01 g. After calculation, the grease yield is 59.03%, and the extraction rate was 98.38%.

Second Embodiment (1) Loading Material:

A SFE-2 model supercritical extractor, produced by American Applied Separation Company, is adopted. A volume of an extraction kettle is 200 mL. A tip at a top portion of the extraction kettle is opened, a first layer of filter paper is laid on a bottom of the extraction kettle, a first layer of degreasing cotton with a thickness of 1.5 cm is laid on the first layer of filter paper, 74.63 g of walnut mud is added on the first layer of degreasing cotton and then compacted for ensuring that there is no gap between the walnut mud and a kettle wall of the extraction kettle, a second layer of degreasing cotton with a thickness of 1.5 cm is laid on the walnut mud, a second layer of filter paper is laid on the second layer of degreasing cotton, and finally the lid at the top portion of the extraction kettle is covered.

(2) Extracting in an Early Stage:

The extraction kettle is perpendicularly installed on the supercritical extractor, a first amount of carbon dioxide fluid is injected into the extraction kettle, the first amount of carbon dioxide fluid flows through the extraction kettle from top to bottom, an extraction temperature is adjusted to 40° C., an extraction pressure is adjusted to 55 MPa, the first extraction is performed for 120 s, a first liquid grease is obtained, an outlet pipeline valve of the extraction kettle is opened to a maximum state, the first liquid grease flows out of the outlet of the extraction kettle, the outlet pipeline valve of the extraction kettle is closed when a large amount of gaseous carbon dioxide flows out of the extraction kettle, a first cycle is formed, the first cycle is repeated for 4 times, and the extracting in the early stage is completed. The extracting in the early stage needs about 15 min, and the obtained grease is about 25.06 g.

(3) Extracting in a Middle Stage:

The extraction kettle is longitudinally flipped by 180 degrees, a second amount of carbon dioxide fluid is injected into the extraction kettle, the second amount of carbon dioxide fluid flows through the extraction kettle from top to bottom, the extraction temperature is adjusted to 40° C., the extraction pressure is adjusted to 55 MPa, the second extraction is performed for 60 s, a second liquid grease is obtained, the outlet pipeline valve of the extraction kettle is opened to the maximum state, the second liquid grease flows out of the outlet of the extraction kettle, the outlet pipeline valve of the extraction kettle is closed when a large amount of gaseous carbon dioxide flows out of the extraction kettle, a second cycle is formed, the second cycle is repeated for 2 times, and the extracting in the middle stage is completed. The extracting in the middle stage needs about 9 min, and the obtained grease is about 44.00 g.

(4) Extracting in a Late Stage:

A third amount of carbon dioxide fluid is injected into the extraction kettle, the third amount of carbon dioxide fluid flows through the extraction kettle from bottom to top, the extraction temperature is adjusted to 40° C., the extraction pressure is adjusted to 35 MPa, the third extraction is performed for 15 s, a third liquid grease is obtained, the outlet pipeline valve of the extraction kettle is opened for 5 s and then is closed, a third cycle is obtained, the third cycle is repeated for 2 times, and the extracting in the late stage is completed. The extracting in the late stage needs about 5 min, and the obtained grease is about 45.22 g. After calculation, the grease yield is 60.59%, and the extraction rate was 99.32%.

Third Embodiment (1) Loading Material:

A SFE-2 model supercritical extractor, produced by American Applied Separation Company, is adopted. A volume of an extraction kettle is 200 mL. A tip at a top portion of the extraction kettle is opened, a first layer of filter paper is laid on a bottom of the extraction kettle, a first layer of degreasing cotton with a thickness of 1.5 cm is laid on the first layer of filter paper, 92.3 g of walnut mud is added on the first layer of degreasing cotton and then compacted for ensuring that there is no gap between the walnut mud and a kettle wall of the extraction kettle, a second layer of degreasing cotton with a thickness of 1.5 cm is laid on the walnut mud, a second layer of filter paper is laid on the second layer of degreasing cotton, and finally the lid at the top portion of the extraction kettle is covered.

(2) Extracting in an Early Stage:

The extraction kettle is perpendicularly installed on the supercritical extractor, a first amount of carbon dioxide fluid is injected into the extraction kettle, the first amount of carbon dioxide fluid flows through the extraction kettle from top to bottom, an extraction temperature is adjusted to 35° C., an extraction pressure is adjusted to 50 MPa, the first extraction is performed for 60 s, a first liquid grease is obtained, an outlet pipeline valve of the extraction kettle is opened to a maximum state, the first liquid grease flows out of the outlet of the extraction kettle, the outlet pipeline valve of the extraction kettle is closed when a large amount of gaseous carbon dioxide flows out of the extraction kettle, a first cycle is formed, the first cycle is repeated for 4 times, and the extracting in the early stage is completed. The extracting in the early stage needs about 20 min, and the obtained grease is about 33.23 g.

(3) Extracting in a Middle Stage:

The extraction kettle is longitudinally flipped by 180 degrees, a second amount of carbon dioxide fluid is injected into the extraction kettle, the second amount of carbon dioxide fluid flows through the extraction kettle from top to bottom, the extraction temperature is adjusted to 35° C., the extraction pressure is adjusted to 50 MPa, the second extraction is performed for 120 s, a second liquid grease is obtained, the outlet pipeline valve of the extraction kettle is opened to the maximum state, the second liquid grease flows out of the outlet of the extraction kettle, the outlet pipeline valve of the extraction kettle is closed when a large amount of gaseous carbon dioxide flows out of the extraction kettle, a second cycle is formed, the second cycle is repeated for 4 times, and the extracting in the middle stage is completed. The extracting in the middle stage needs about 10 min, and the obtained grease is about 54.45 g.

(4) Extracting in a Late Stage:

A third amount of carbon dioxide fluid is injected into the extraction kettle, the third amount of carbon dioxide fluid flows through the extraction kettle from bottom to top, the extraction temperature is adjusted to 50° C., the extraction pressure is adjusted to 35 MPa, the third extraction is performed for 10 s, a third liquid grease is obtained, the outlet pipeline valve of the extraction kettle is opened for 5 s and then is closed, a third cycle is obtained, the third cycle is repeated for 2 times, and the extracting in the late stage is completed. The extracting in the late stage needs about 3 min, and the obtained grease is about 54.92 g. After calculation, the grease yield is 59.5%, and the extraction rate was 97.54%.

Fourth Embodiment (1) Loading Material:

A SFE-2 model supercritical extractor, produced by American Applied Separation Company, is adopted. A volume of an extraction kettle is 200 mL. A tip at a top portion of the extraction kettle is opened, a first layer of filter paper is laid on a bottom of the extraction kettle, a first layer of degreasing cotton with a thickness of 1.5 cm is laid on the first layer of filter paper, 84.1 g of almond powers with a particle size of larger than and equal to 40 meshes are added on the first layer of degreasing cotton and then compacted for ensuring that there is no gap between the almond powers and a kettle wall of the extraction kettle, a second layer of degreasing cotton with a thickness of 1.5 cm is laid on the almond powers, a second layer of filter paper is laid on the second layer of degreasing cotton, and finally the lid at the top portion of the extraction kettle is covered.

(2) Extracting in an Early Stage:

The extraction kettle is perpendicularly installed on the supercritical extractor, a first amount of carbon dioxide fluid is injected into the extraction kettle, the first amount of carbon dioxide fluid flows through the extraction kettle from top to bottom, an extraction temperature is adjusted to 45° C., an extraction pressure is adjusted to 45 MPa, the first extraction is performed for 60 s, a first liquid grease is obtained, an outlet pipeline valve of the extraction kettle is opened to a maximum state, the first liquid grease flows out of the outlet of the extraction kettle, the outlet pipeline valve of the extraction kettle is closed when a large amount of gaseous carbon dioxide flows out of the extraction kettle, a first cycle is formed, the first cycle is repeated for 4 times, and the extracting in the early stage is completed. The extracting in the early stage needs about 18 min, and the obtained grease is about 29.44 g.

(3) Extracting in a Middle Stage:

The extraction kettle is longitudinally flipped by 180 degrees, a second amount of carbon dioxide fluid is injected into the extraction kettle, the second amount of carbon dioxide fluid flows through the extraction kettle from top to bottom, the extraction temperature is adjusted to 45° C., the extraction pressure is adjusted to 45 MPa, the second extraction is performed for 60 s, a second liquid grease is obtained, the outlet pipeline valve of the extraction kettle is opened to the maximum state, the second liquid grease flows out of the outlet of the extraction kettle, the outlet pipeline valve of the extraction kettle is closed when a large amount of gaseous carbon dioxide flows out of the extraction kettle, a second cycle is formed, the second cycle is repeated for 3 times, and the extracting in the middle stage is completed. The extracting in the middle stage needs about 9 min, and the obtained grease is about 39.95 g.

(4) Extracting in a Late Stage:

A third amount of carbon dioxide fluid is injected into the extraction kettle, the third amount of carbon dioxide fluid flows through the extraction kettle from bottom to top, the extraction temperature is adjusted to 35° C., the extraction pressure is adjusted to 35 MPa, the third extraction is performed for 10 s, a third liquid grease is obtained, the outlet pipeline valve of the extraction kettle is opened for 5 s and then is closed, a third cycle is obtained, the third cycle is repeated for 2 times, and the extracting in the late stage is completed. The extracting in the late stage needs about 3 min, and the obtained grease is about 41.25 g. After calculation, the grease yield is 49.05%, and the extraction rate was 93.43%.

Fifth Embodiment (1) Loading Material:

A SFE-2 model supercritical extractor, produced by American Applied Separation Company, is adopted. A volume of an extraction kettle is 200 mL. A tip at a top portion of the extraction kettle is opened, a first layer of filter paper is laid on a bottom of the extraction kettle, a first layer of degreasing cotton with a thickness of 1.5 cm is laid on the first layer of filter paper, 71.4 g of almond powers with a particle size of larger than and equal to 40 meshes are added on the first layer of degreasing cotton and then compacted for ensuring that there is no gap between the almond powers and a kettle wall of the extraction kettle, a second layer of degreasing cotton with a thickness of 1.5 cm is laid on the almond powers, a second layer of filter paper is laid on the second layer of degreasing cotton, and finally the lid at the top portion of the extraction kettle is covered.

(2) Extracting in an Early Stage:

The extraction kettle is perpendicularly installed on the supercritical extractor, a first amount of carbon dioxide fluid is injected into the extraction kettle, the first amount of carbon dioxide fluid flows through the extraction kettle from top to bottom, an extraction temperature is adjusted to 35° C., an extraction pressure is adjusted to 40 MPa, the first extraction is performed for 60 s, a first liquid grease is obtained, an outlet pipeline valve of the extraction kettle is opened to a maximum state, the first liquid grease flows out of the outlet of the extraction kettle, the outlet pipeline valve of the extraction kettle is closed when a large amount of gaseous carbon dioxide flows out of the extraction kettle, a first cycle is formed, the first cycle is repeated for 5 times, and the extracting in the early stage is completed. The extracting in the early stage needs about 17 min, and the obtained grease is about 22.23 g.

(3) Extracting in a Middle Stage:

The extraction kettle is longitudinally flipped by 180 degrees, a second amount of carbon dioxide fluid is injected into the extraction kettle, the second amount of carbon dioxide fluid flows through the extraction kettle from top to bottom, the extraction temperature is adjusted to 35° C., the extraction pressure is adjusted to 55 MPa, the second extraction is performed for 60 s, a second liquid grease is obtained, the outlet pipeline valve of the extraction kettle is opened to the maximum state, the second liquid grease flows out of the outlet of the extraction kettle, the outlet pipeline valve of the extraction kettle is closed when a large amount of gaseous carbon dioxide flows out of the extraction kettle, a second cycle is formed, the second cycle is repeated for 2 times, and the extracting in the middle stage is completed. The extracting in the middle stage needs about 9 min, and the obtained grease is about 33.70 g.

(4) Extracting in a Late Stage:

A third amount of carbon dioxide fluid is injected into the extraction kettle, the third amount of carbon dioxide fluid flows through the extraction kettle from bottom to top, the extraction temperature is adjusted to 35° C., the extraction pressure is adjusted to 35 MPa, the third extraction is performed for 10 s, a third liquid grease is obtained, the outlet pipeline valve of the extraction kettle is opened for 5 s and then is closed, a third cycle is obtained, the third cycle is repeated for 3 times, and the extracting in the late stage is completed. The extracting in the late stage needs about 5 min, and the obtained grease is about 35.80 g. After calculation, the grease yield is 50.41%, and the extraction rate was 95.50%.

The above content is only for explaining the technical idea of the present invention, and is not intended to limit the protective scope of the present invention. Any modification made on the basis of the technical solution according to the technical idea proposed by the present invention falls within the protective scope of the claims of the present invention.

What is claimed is:

1. A supercritical oil extraction method, comprising steps of:

(S1) loading material which comprises:
opening a lid at a top portion of an extraction kettle, laying a first layer of filter paper on a bottom of the extraction kettle, laying a first layer of degreasing cotton on the filter paper, adding an oily raw material on the first layer of degreasing cotton, compacting the oily raw material, laying a second layer of degreasing cotton on the compacted oily raw material, laying a second layer of filter paper on the second layer of degreasing cotton, and covering the lid at the top portion of the extraction kettle;

(S2) extracting in an early stage which comprises:
injecting a first amount of extractant into the extraction kettle, flowing the first amount of extractant through the extraction kettle from top to bottom, adjusting an extraction temperature to be in a range of 20 to 80° C. and an extraction pressure to be in a range of 20 to 80 MPa, firstly extracting for 30-180 s, obtaining a first liquid grease, opening an outlet pipeline valve of the extraction kettle, flowing the first liquid grease out of the outlet of the extraction kettle, closing the outlet pipeline valve of the extraction kettle, forming a first cycle, repeating the first cycle for 2-5 times, and completing the extraction in the early stage;

(S3) extracting in a middle stage which comprises:
longitudinally flipping the extraction kettle by 180 degrees, injecting a second amount of extractant into the extraction kettle, flowing the second amount of extractant through the extraction kettle from top to bottom, adjusting the extraction temperature to be in a range of 20 to 80° C. and the extraction pressure to be in a range of 20 to 80 MPa, secondly extracting for 30-180 s, obtaining a second liquid grease, opening the outlet pipeline valve of the extraction kettle, flowing the second liquid grease out of the outlet of the extraction kettle, closing the outlet pipeline valve of the extraction kettle, forming a second cycle, repeating the second cycle for 2-5 times, and completing the extraction in the middle stage; and (S4) extracting in a late stage which comprises:
injecting a third amount of extractant into the extraction kettle, flowing the third amount of extractant through the extraction kettle from bottom to top, adjusting the extraction temperature to be in a range of 20 to 80° C. and the extraction pressure to be in a range of 20 to 80 MPa, thirdly extracting for 10-15 s, obtaining a third liquid grease, opening the outlet pipeline valve of the extraction kettle for 3-5 s, closing the outlet pipeline valve of the extraction kettle, forming a third cycle, repeating the third cycle for 2-3 times, and completing the extraction in the late stage.

2. The supercritical oil extraction method, as recited in claim 1, wherein: in the step of (S2), the first amount of extractant is injected into the extraction kettle, the first amount of extractant flows through the extraction kettle from top to bottom, the extraction temperature is adjusted to be in a range of 30 to 50° C. and the extraction pressure is adjusted to be in a range of 30 to 50 MPa, the first extraction is performed for 60-120 s, the first liquid grease is obtained, the outlet pipeline valve of the extraction kettle is opened, the first liquid grease flows out of the outlet of the extraction kettle, the outlet pipeline valve of the extraction kettle is closed, the first cycle is formed, the first cycle is repeated for 3-4 times, and the extraction in the early stage is completed.

3. The supercritical oil extraction method, as recited in claim 1, wherein: in the step of (S3), the extraction kettle is longitudinally flipped by 180 degrees, the second amount of extractant is injected into the extraction kettle, the second amount of extractant flows through the extraction kettle from top to bottom, the extraction temperature is adjusted to be in a range of 30 to 50° C. and the extraction pressure is adjusted to be in a range of 30 to 50 MPa, the second extraction is performed for 60-120 s, the second liquid grease is obtained, the outlet pipeline valve of the extraction kettle is opened, the second liquid grease flows out of the outlet of the extraction kettle, the outlet pipeline valve of the extraction kettle is closed, the second cycle is formed, the second cycle is repeated for 3-4 times, and the extraction in the middle stage is completed.

4. The supercritical oil extraction method, as recited in claim 1, wherein: in the step of (S4), the third amount of extractant is injected into the extraction kettle, the third amount of extractant flows through the extraction kettle from bottom to top, the extraction temperature is adjusted to be in a range of 30 to 50° C. and the extraction pressure is adjusted to be in a range of 30 to 35 MPa, the third extraction is performed for 10-15 s, the third liquid grease is obtained, the outlet pipeline valve of the extraction kettle is opened for 3-5 s and then the outlet pipeline valve of the extraction kettle is closed, the third cycle is formed, the third cycle is repeated for 2-3 times, and the extraction in the late stage is completed.

5. The supercritical oil extraction method, as recited in claim 1, wherein: all of the first amount of extractant, the second amount of extractant and the third amount of extractant are carbon dioxide.

6. The supercritical oil extraction method, as recited in claim 2, wherein: all of the first amount of extractant, the second amount of extractant and the third amount of extractant are carbon dioxide.

7. The supercritical oil extraction method, as recited in claim 3, wherein: all of the first amount of extractant, the second amount of extractant and the third amount of extractant are carbon dioxide.

8. The supercritical oil extraction method, as recited in claim 4, wherein: all of the first amount of extractant, the second amount of extractant and the third amount of extractant are carbon dioxide.

\* \* \* \* \*